United States Patent [19]
Gu et al.

[11] Patent Number: 5,585,019
[45] Date of Patent: Dec. 17, 1996

[54] LASER MACHINING OF A WORKPIECE THROUGH ADJACENT MASK BY OPTICAL ELEMENTS CREATING PARALLEL BEAMS

[75] Inventors: Bo Gu, Kanata; John Hunter, Almonte, both of Canada

[73] Assignee: Lumonics Inc., Kanata, Canada

[21] Appl. No.: 402,333

[22] Filed: Mar. 10, 1995

[51] Int. Cl.$^6$ ............................................. B23K 26/06
[52] U.S. Cl. ....................... 219/121.73; 219/121.74; 219/121.75; 219/121.8
[58] Field of Search .................. 219/121.68, 121.69, 219/121.74, 121.78, 121.8, 121.7, 121.71, 121.79, 121.81, 121.75

[56] References Cited

U.S. PATENT DOCUMENTS

| | | | |
|---|---|---|---|
| 3,699,649 | 10/1972 | McWilliams | 219/121.69 |
| 3,742,182 | 6/1973 | Saunders | 219/121.71 |
| 4,328,410 | 5/1982 | Slivinsky et al. | 219/121.69 |
| 4,387,952 | 6/1983 | Slusher | 219/121.8 |
| 4,866,238 | 9/1989 | Karube | 219/121.78 |
| 5,037,183 | 8/1991 | Gagosz et al. | 219/121.7 |
| 5,136,136 | 8/1992 | Karube et al. | 219/121.74 |
| 5,296,673 | 3/1994 | Smith | 219/121.75 |
| 5,310,986 | 5/1994 | Zumoto et al. | 219/121.74 |
| 5,313,043 | 5/1994 | Yamagishi | 219/121.74 |
| 5,449,879 | 9/1995 | Lawson et al. | 219/121.74 |

FOREIGN PATENT DOCUMENTS

| | | | |
|---|---|---|---|
| 59-166389 | 9/1984 | Japan | 219/121.74 |

OTHER PUBLICATIONS

Hopkins, R. E. et al., "Optics for Laser Scanning", Optical Engineering, vol. 15(2), pp. 90–94, Mar./Apr. 1976.

Bachmann, F. G., "Generation of Blind Via–Holes for a High Density Multi–Chip–Module Using Excimer Lasers", Mat. Res. Soc. Symp. Proc., vol. 158, Dec. 1990.

Primary Examiner—Geoffrey S. Evans

[57] ABSTRACT

A laser machining system employs a perforated proximity mask placed on or near a generally planar workpiece surface. Holes in the mask define a pattern of holes in the workpiece or marks on its surface to be formed by laser beam pulses passing through the mask. The beam is indexed from hole to hole or between groups of holes in the mask, between the pulses (or groups of pulses) of the laser. This indexing can be carried out by a pair of rotatable mirrors that direct the beam to a series of different holes in the mask via an optical element, e.g. a concave mirror or a telecentric lens assembly. This optical element converts the beams received from the indexing mirrors to a series of parallel beams that are directed to strike the mask and hence the workpiece generally normal to the workpiece surface. The optical element also serves the purpose of focusing each beam.

26 Claims, 3 Drawing Sheets

LASER MACHINING OF A WORKPIECE THROUGH ADJACENT MASK BY OPTICAL ELEMENTS CREATING PARALLEL BEAMS

FIELD OF THE INVENTION

The invention relates to a laser machining system, that is to say a system in which the energy of a laser beam is used to drill holes in, or otherwise etch or ablate, a workpiece, including making marks or patterns on the workpiece or cutting it into parts.

BACKGROUND OF THE INVENTION

In a typical prior machining system of this general type, a beam from a pulsed laser is used to form a relatively large number of holes in a workpiece. Each laser pulse or series of pulses forms an individual hole. Between pulses (or series of pulses) the workpiece is moved mechanically to a new position relative to the beam to make a new hole, or the machining head directing the beam is moved while the workpiece stay fixed. In either case, the system requires a relatively long time (relative to the pulse repetition rate of the laser) for the workpiece or the machining head to be physically moved from alignment with one machining location on the workpiece to alignment with the next such location. Especially if a large number of holes spread out over an extensive workpiece surface are to be drilled, the total time required for the repeated mechanical realignment of the beam and the workpiece is excessive, resulting in a low throughput and high manufacturing costs.

PRIOR ART

A paper entitled "Generation of Blind Via-Holes for a High Density Multi-Chip-Module using Excimer Lasers" by F. G. Bachmann published in Materials Research Society Symp. Proc. Vol. 158, 1990, discloses, especially in FIGS. 8(a) and (b), a system that employs a mask in contact with the workpiece. The mask is perforated, i.e. has a series of holes orientated in the same layout as the vias to be formed in the workpiece. An excimer laser beam is caused to illuminate a number of mask holes simultaneously forming up to 60 vias at the same time by repeated pulses, e.g. 300 to 400 pulses. After these vias have been formed, the laser beam is caused to carry out a meandering scan over the mask with each hole in the mask receiving the correct number of pulses required to produce a completed via in the workpiece beneath the mask.

SUMMARY OF THE INVENTION

An object of the present invention is to provide a system that is more efficient in its utilization of the laser energy, while reducing delays involved in repositioning a machining head relative to a workpiece.

A further object of the invention is to ensure that each time the beam strikes the workpiece it does so in substantially the same direction, e.g. so that the axes of any holes formed in the workpiece will be substantially parallel to each other. With a workpiece surface that is generally planar all these holes can then be made substantially normal to the workpiece surface.

To this end, the invention provides a laser machining method comprising positioning a proximity mask adjacent to the surface of a workpiece, and directing a laser beam pulse or group of pulses onto at least one window in the mask to pass through said window or windows and modify, e.g. mark or form a hole in, the workpiece beyond. The beam is repeatedly indexed so that subsequent pulses or groups of pulses strike the mask at each of a series of different locations to pass through each of a series of further windows or groups of windows in the mask to modify the workpiece beyond these further windows. The direction of incidence of the beam on the mask remains substantially constant, and preferably normal to the workpiece surface.

The mask will normally be a perforated one with simple holes for the windows. However, it can be an electronic mask, or other light modifying device. For example, devices are known, commonly called light valves or spatial light modulators, that can be switched to transmit all or none of a light beam. The switching may be mechanical, as by shutters, or may be achieved by electro-optical means, such as liquid crystal light valves, or magneto-optical means. The mask can then be controlled by a computer to change the array of windows without the need to remove the mask and replace it by a different one.

Each beam is preferably focused to a size just larger than the largest window in the mask so that the area of the beam that strikes opaque (or otherwise non-transmitting) surfaces of the mask (and hence the amount of energy wasted) is kept relatively low. Most of the energy of each pulse can then pass through a mask window and be usefully employed in forming a hole in, or otherwise modifying, the workpiece. On the other hand, if two or more holes in the mask are relatively close together, the cross-section of the laser beam may be made large enough to pass through these multiple holes simultaneously without any excessive loss of energy in the opaque portions of the mask.

This arrangement is in contrast to the system shown by Bachmann where the laser beam has a cross-section that extends over the entire workpiece (or the entire section of the workpiece currently being worked on) in order to form multiple vias simultaneously. It is apparent from FIG. 8a of the Bachmann disclosure that the majority of the laser beam strikes opaque portions of the mask, which represents wasted energy.

Instead of employing Bachmann's technique of scanning the beam, the present invention indexes the beam each time onto a fresh individual or group of individual windows in the mask. This indexing can, in most instances, be carried out without a need to move the workpiece mechanically relative to the optical system, i.e. while maintaining unchanged the spatial relationship of the workpiece and the optical system that produces the beam.

The invention also provides laser machining apparatus comprising a proximity mask for location adjacent a surface of a workpiece, and a main optical element, such as a concave mirror or a telecentric lens, that has an extent at least as great as that of the workpiece surface. An indexing device, e.g. one or more rotatable mirrors, directs a laser beam pulse or group of pulses separately to each of a series of different locations on the optical element for transmission by said element to corresponding different locations on the mask to pass through one or more corresponding windows in the mask and modify the workpiece surface beyond such windows. The optical element is such that the direction of incidence of the beam on the mask remains substantially constant, and preferably normal to the workpiece surface. The optical element will also serve to focus the beam at the workpiece.

If the optical system consists solely of a concave mirror, this mirror will need to be slightly aspherical, e.g. approximately paraboloidal. The exact optimum shape can be calculated for each situation, having regard to the location of the indexing device relative to the mirror, and to the dimensions of the mirror and the mask and their distance apart. However, a secondary optical element can be added, such as a lens between the indexing device and the concave mirror. In this case, the shape of the surface of the mirror can be changed, and in particular it can be made spherical. This represents a simplification from the manufacturing viewpoint.

DETAILED DESCRIPTION OF THE EMBODIMENTS

Figure 1:
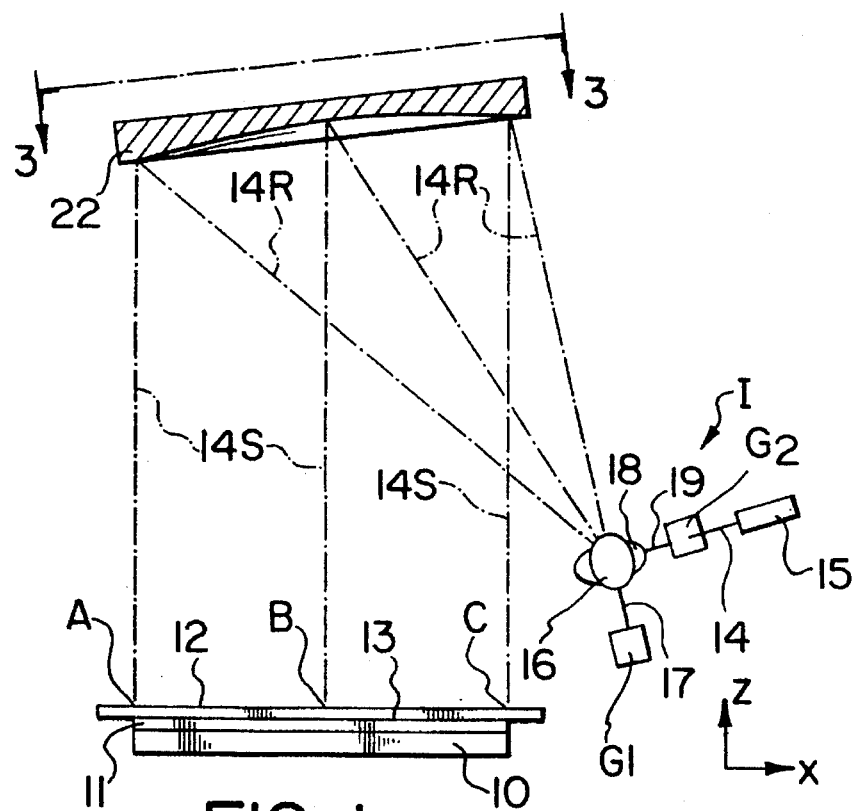
FIG. 1 shows diagrammatically a preferred embodiment of the inventions.

As shown in FIG. 1 a vacuum chuck 10 holds a selected portion 11 of a workpiece firmly in position. It will be appreciated that the entire workpiece may extend beyond the portion 11 shown in FIG. 1. However, for the purposes of this description and the appended claims the portion 11 will be treated as "the workpiece." A conventional perforated or similarly functioning mask 12 is placed in contact with an upper surface 13 of this workpiece 11 to receive the laser beam. Holes (shown in the embodiment of FIG. 4) or other windows in the mask 12 that will transmit a laser beam are arrayed in the same orientation as that in which holes or other modifications are to be formed in the workpiece surface 13.

The mask 12 is a contact mask, i.e. it is in direct contact with the workpiece surface 13. The invention can, however, be practiced with a mask that is spaced somewhat from the surface 13, i.e. a near contact or conformal mask. In this specification and claims, contact, near contact and conformal masks are generically described as "proximity" masks. A proximity mask is in contrast to a projection mask that is used in a system in which, after the laser beam has passed through a window in the mask, it is subsequently focused and/or directed or modified by one or more optical elements before it strikes the workpiece. In the case of a proximity mask the beam is not subject to any further optical or mechanical modification after it has passed through the mask and before it strikes the workpiece.

A beam 14 from a laser 15 is directed onto a first flat mirror 16 rotatable about an axis 17 by a first galvanometer G1. The beam reflected from the mirror 16 strikes a second flat mirror 18 rotatable about an axis 19 by a galvanometer G2. The galvanometers G1 and G2 serve to index the reflected beams now identified as 14R in the X and Y directions respectively. The X and Z directions are as shown on the drawing and the Y direction is perpendicular to both of them. This rotatable mirror assembly, which is conventional, constitutes an indexing device I.

Figure 3:
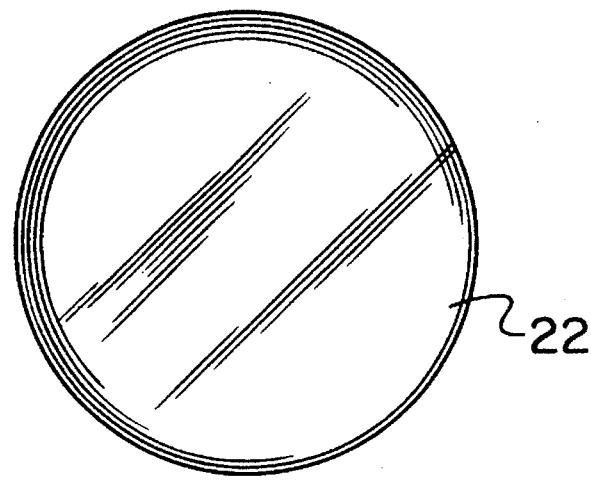
FIG. 3 is plan view taken on the line 3—3 in FIG. 1.

After leaving the second rotatable mirror 18 each indexed beam 14R travels to an optical element in the form of a concave mirror 22. Conveniently the mirror 22 will be aspherical, e.g. approximately paraboloidal, that is approximately parabolic in both the X and Y directions, since the indexing takes place in both these directions. The mirror 22 is either circular (see FIG. 3) or square and has an extent at least as great as that of the workpiece surface in both the X and Y directions. It serves to transmit (reflect) each beam 14R as a beam that is now designated 14S. The various beams 14S are generally parallel to each other and extend generally in the Z direction, i.e. generally normal to the mask 12 and to the surface 13 of the workpiece 11, assuming that this surface is planar in the X Y plane. The beams 14S are successively indexed by the movable mirrors 16, 18 to strike the mask 12 at each of a series of different locations, e.g. locations A, B and C distributed across the surface 13 in the X and Y directions. This indexing function (movement of the mirrors 16, 18) takes place during the interval between laser pulses (or groups of pulses), so that these rotatable mirrors will have been repositioned in the desired new orientation when the next pulse (or group of pulses) occurs. Each new orientation chosen will coincide with that of a window or group of windows in the mask 12 to minimise the laser energy wasted by striking opaque portions of the mask. Each time the beam passes through a window in the mask, it drills a hole in, or otherwise marks or modifies, the workpiece beyond such window.

Figure 2:
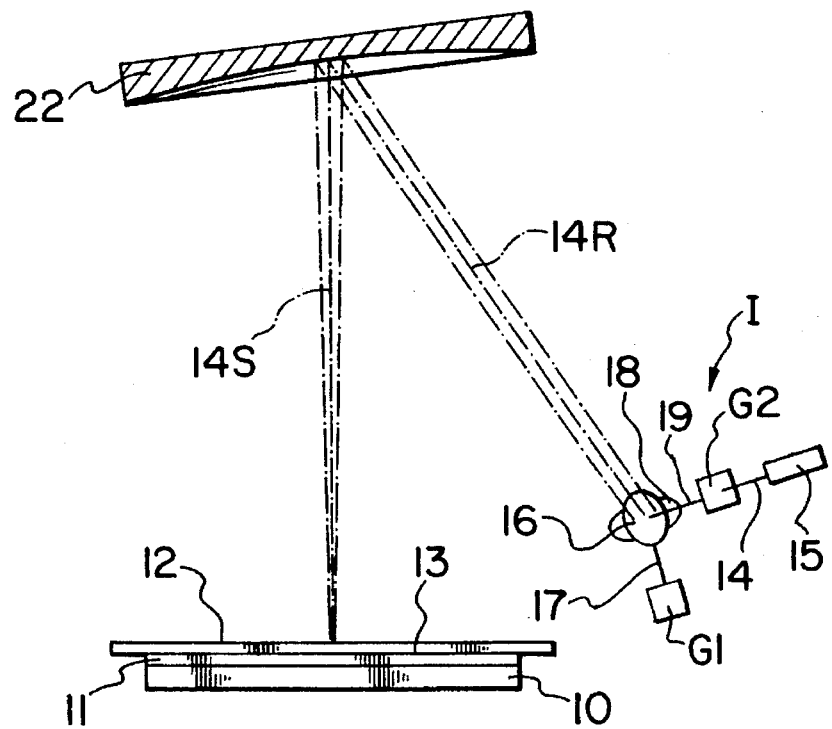
FIG. 2 illustrates a further function of the system of FIG. 1.

As shown in FIG. 2 the curved reflective surface of the aspherical mirror 22 also serves to focus each beam 14S. If necessary, appropriate secondary optics upstream or downstream of the rotatable mirror assembly 16, 18 (preferably downstream) can be used to so shape and/or dimension the incoming laser beam that, after focusing by the aspherical mirror 22, it will have the desired shape and size both to pass through each window in the mask with a substantially uniform transverse energy distribution and to fully cover the window or windows with only a relatively small overlap at the edges. In practice, this focusing can increase the energy density of the incoming beam 14 by about fiftyfold or more.

Figure 4:
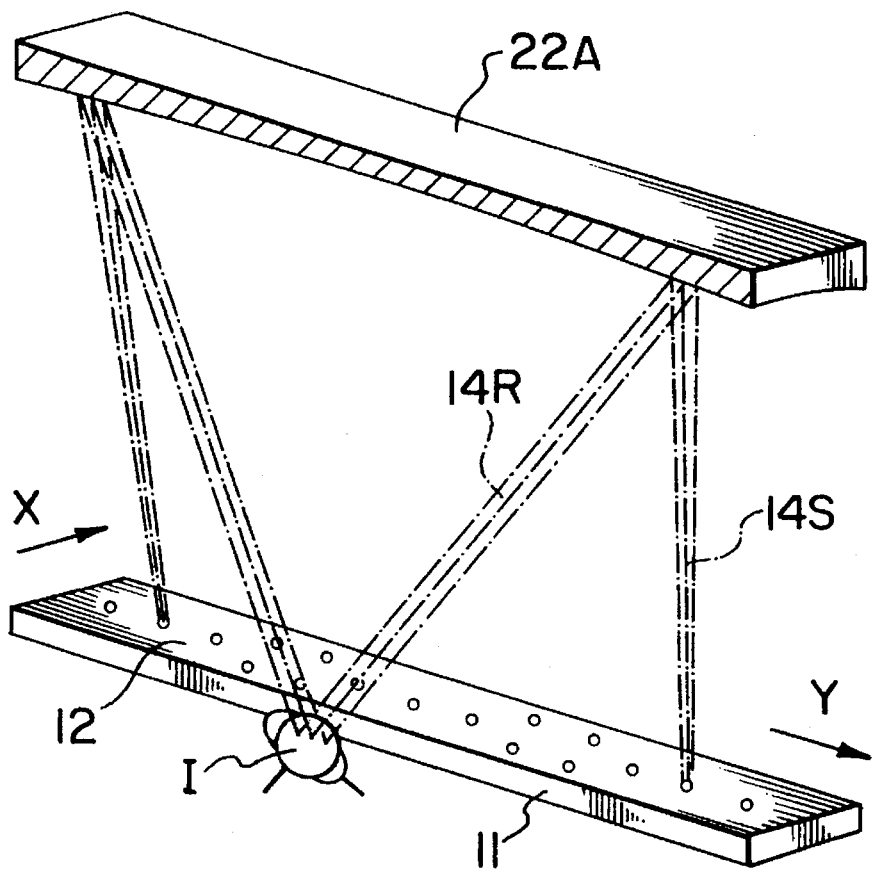
FIG. 4 is a perspective view of an alternative construction.

FIG. 4 shows an alternative embodiment using a mirror 22A that is, in effect, a slice of the full mirror 22. In this case the mask 12 and the workpiece 11 beneath it have relatively short dimensions in the X direction. The scanning effect in the X direction is achieved by moving the mask and workpiece relative to the mirror 22A. The reflecting surface of the smaller mirror 22A will continue to be aspherical, but the indexing device I can be located relatively close to the optical axis of the mirror. This decreases the angle at the mirror 22A between the incoming and outgoing beams 14R and 14S and hence reduces scan errors. In the indexing device I the rotatable mirror that generates the scan in the Y direction is fully active, while the rotatable mirror for the X direction scan functions mainly to provide a small degree of scanning in the X direction at the mask and also to compensate for scan errors.

Figure 5:
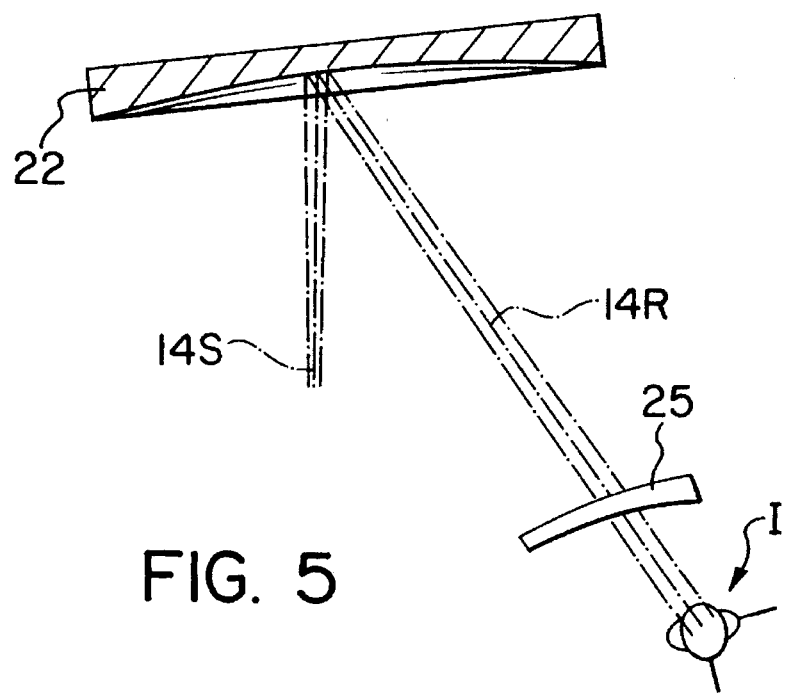
FIG. 5 is a view similar to FIG. 1 but with the addition of a secondary optical element.

FIG. 5 shows the addition of secondary correcting optics in the form of a somewhat asymmetrical lens 25 situated downstream of the indexing device I. This lens 25 is used to perform a preliminary (partial) focusing function on the beam 14R. In other words, the beam 14R received by the mirror 22 (or 22A) will already have some focusing taper, the remainder of the focusing effect being provided by the mirror 22 (or 22A) itself. In this circumstance there is no longer a need for the mirror 22 (or 22A) to be aspherical. It can be spherical, which substantially reduces the manufacture complications and hence the cost of this mirror.

Figure 6:
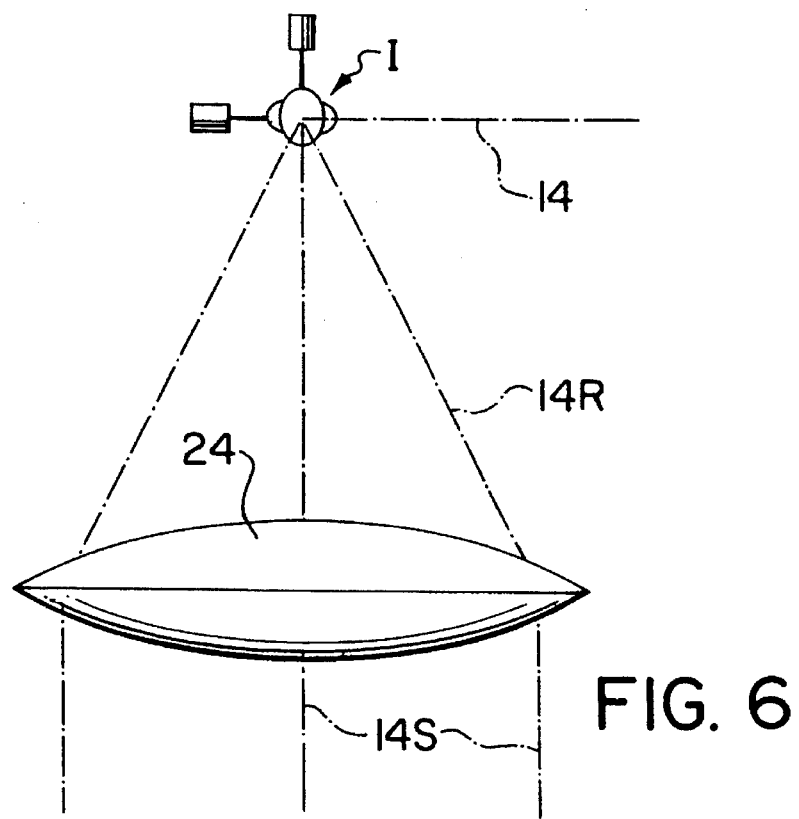
FIG. 6 is a diagrammatic fragmentary view showing another alternative construction.

FIG. 6 illustrates an alternative construction in which, instead of a mirror, the main optical element is a telecentric lens assembly 24 that on one side receives the laser beams 14R from the indexing device I and transmits the beams 14S from its other side to the desired locations on the mask. While the telecentric lens assembly 24 has been shown diagrammatically as a single lens, in practice it will normally be a complex lens assembly, for example, as shown in FIG. 4 of the publication "Optics for Laser Scanning" by R. E. Hopkins et al., in Optical Engineering, Vol. 15(2), pp 90–94.

Unless the portion of the workpiece being worked on has only a relatively small lateral extent, so that a relatively small telecentric lens assembly can be used (since the two need to have the same lateral extent), the use of a reflective optical element, e.g. a mirror, is preferred, since it is normally cheaper than a lens of corresponding size. In other words, the use of a reflective optical element rather than a refractive one enables the beam to be indexed over a larger field, so that the apparatus can work on a relatively large workpiece or section of a workpiece.

The laser used may be an excimer laser, a $CO_2$ laser, a YAG laser, or any high power laser above about one watt in average power. The wavelength chosen depends on the material of the workpiece. For example, for a polyimide workpiece, a $CO_2$ laser operating at 9–11 microns is suitable. The mirror 22 (or 22A) will preferably be made of polished, solid aluminum, and the galvanometers G1, G2 will be required to have the ability to function at about 150 Hz.

The reflecting surfaces of the rotatable mirrors of the indexing device I will preferably be located as close as possible to the focal point of the mirror 22 (or 22A) or of the telecentric lens assembly 24.

In all embodiments of the invention the apparatus is designed to achieve as far as possible a uniform beam size at the different locations on the workpiece.

Another important feature is the maintenance within relatively narrow tolerances of the perpendicularity of the beam at the workpiece.

We claim:

1. A laser machining method comprising
   (a) positioning a proximity mask adjacent a surface of a workpiece;
   (b) employing an optical system including a laser to generate a laser beam pulse or group of pulses; and
   (c) while maintaining unchanged the spatial relationship of the workpiece and the optical system directing the pulse or group of pulses onto at least one window in the mask to pass therethrough and modify the workpiece and repeatedly indexing the beam so that subsequent pulses or groups of pulses strike the mask at each of a series of different locations to pass through each of a series of further windows or groups of windows in the mask to modify the workpiece in such a manner that the direction of incidence of the beam on the mask remains substantially constant.

2. A method according to claim 1, wherein the workpiece surface is generally planar and the constant direction of incidence of the beam is substantially normal to the workpiece surface.

3. A method according to claim 1, wherein the modification of the workpiece surface by each laser beam pulse or group of pulses is the formation of a mark on said surface or a hole in said workpiece.

4. A method according to claim 1, wherein the step of directing the beam onto the mask includes focusing the beam.

5. A method according to claim 4, wherein the step of directing the beam onto the mask and of focusing the beam is performed by a combination of a concave mirror and an additional optical element in the path of the beam.

6. A method according to claim 5, wherein the mirror is substantially spherical.

7. A method according to claim 1, wherein the step of directing the beam onto the mask is performed by a concave mirror.

8. A method according to claim 7, wherein the mirror is aspherical and approximately paraboloidal.

9. A method according to claim 1, including making the size of the beam cross section substantially uniform among said different locations.

10. A method according to claim 1, wherein said indexing is performed at a speed of about 150 Hz.

11. Laser machining apparatus comprising
    (a) a proximity mask for location adjacent a surface of a workpiece;
    (b) an optical element having an extent at least as great as that of the workpiece surface; and
    (c) an indexing device for directing a laser beam pulse or group of pulses to each of a series of different locations on the optical element for transmission by said element to corresponding different locations on the mask to pass through one or more windows in the mask and modify the workpiece surface beyond said windows;
    (d) the optical element being such that the direction of incidence of the beam on the mask remains substantially constant.

12. Laser machining apparatus according to claim 11, wherein the workpiece surface is generally planar and the constant direction of incidence of the beam is substantially normal to the workpiece surface.

13. Laser machining apparatus according to claim 11, wherein the optical element comprises a concave mirror.

14. Laser machining apparatus according to claim 13, wherein the mirror is aspherical and approximately paraboloidal.

15. Laser machining apparatus according to claim 13, wherein the indexing device comprises a rotatable mirror assembly for receiving the laser beam and directing it to a series of different locations on the concave mirror for reflection to corresponding locations on the mask.

16. Laser machining apparatus according to claim 13, wherein the concave mirror lies in a plane that is slanted relative to the workpiece surface, the indexing device being positioned laterally of the laser beams transmitted by the concave mirror to the mask.

17. Laser machining apparatus according to claim 13, including a secondary optical element located between the indexing device and the mirror for partially focusing a laser beam.

18. Laser machining apparatus according to claim 17, wherein the concave mirror is spherical.

19. Laser machining apparatus according to claim 11, wherein the optical element is a telecentric lens assembly.

20. Laser machining apparatus according to claim 19, wherein the indexing device comprises a rotatable mirror assembly for receiving the laser beam and directing it to a series of different locations on one side of the telecentric lens assembly for transmission through said lens assembly to said corresponding locations on the mask.

21. Laser machining apparatus according to claim 11, wherein the optical element is such that the size of the beam cross section is substantially uniform among said different locations.

22. Laser machining apparatus according to claim 11, wherein the optical element also serves to focus or assist in focusing each of the laser beams transmitted to the mask.

23. A laser machining method comprising
(a) employing an optical system including a laser to generate a laser beam pulse or group of pulses; and
(b) while maintaining unchanged the spatial relationship of a workpiece and the optical system directing the pulse or group of pulses onto at least one location on a surface of the workpiece to modify the workpiece, and repeatedly indexing the beam so that subsequent pulses or groups of pulses strike the workpiece surface at each of a series of different locations to modify the workpiece in such a manner that the direction of incidence of the beam on the workpiece surface remains substantially constant.

24. A laser machining apparatus comprising
(a) an optical element having an extent at least as great as that of a workpiece surface; and
(b) an indexing device for directing a laser beam pulse or group of pulses to each of a series of different locations on the optical element for transmission by said element to corresponding different locations on the workpiece surface to modify said workpiece;
(c) the optical element being such that the direction of incidence of the beam on the workpiece surface remains substantially constant.

25. Laser machining apparatus according to claim 24, wherein the optical element comprises a concave mirror.

26. Laser machining apparatus according to claim 24, wherein the optical element is a telecentric lens assembly.

* * * * *

UNITED STATES PATENT AND TRADEMARK OFFICE
CERTIFICATE OF CORRECTION

PATENT NO. : 5,585,019
DATED : December 17, 1996
INVENTOR(S) : Gu et al.

It is certified that error appears in the above-identified patent and that said Letters Patent is hereby corrected as shown below:

On the title page, item [54] and Col. 1, lines 1-3,
the title to read.

LASER MACHINING OF A WORKPIECE BY OPTICAL
ELEMENTS CREATING PARALLEL BEAMS

Signed and Sealed this

First Day of April, 1997

*Attest:*

BRUCE LEHMAN

*Attesting Officer*  *Commissioner of Patents and Trademarks*